United States Patent [19]

Shimizu

[11] 4,314,705
[45] Feb. 9, 1982

[54] OIL SEAL DEVICE

[75] Inventor: Masami Shimizu, Chiba, Japan

[73] Assignee: Ishikawajima-Harima Jukogyo Kabushiki Kaisha, Tokyo, Japan

[21] Appl. No.: 150,804

[22] Filed: May 19, 1980

[30] Foreign Application Priority Data

May 23, 1979 [JP] Japan .............................. 54-69224[U]
Jul. 10, 1979 [JP] Japan .............................. 54-94991[U]

[51] Int. Cl.³ .......................................... F16J 15/42
[52] U.S. Cl. ..................................... 277/67; 277/133; 415/175
[58] Field of Search ..................... 277/12, 13, 67, 133; 415/170 R, 175

[56] References Cited

U.S. PATENT DOCUMENTS

| 2,266,407 | 12/1941 | Bruestle | 277/67 |
| 2,914,038 | 11/1959 | McKellar | 277/67 |
| 4,157,834 | 6/1979 | Burdette | 277/67 |

FOREIGN PATENT DOCUMENTS

| 662150 | 12/1951 | United Kingdom | 277/67 |
| 1282719 | 7/1972 | United Kingdom | 277/67 |

Primary Examiner—Robert I. Smith
Attorney, Agent, or Firm—B. B. Olive

[57] ABSTRACT

Disclosed is an oil seal device using oil seal rings and a centrifugal oil thrower and having a construction such that the oil seal rings are provided on each side of the oil thrower to minimize the amount of oil that leaks to the oil thrower.

6 Claims, 7 Drawing Figures

OIL SEAL DEVICE

BACKGROUND OF THE INVENTION

The present invention relates to an oil seal device for use with high speed rotating machines.

In high speed rotating machines such as turbochargers, lubrication of bearings is very important and for this reason the bearings require oil seal devices with high sealing capabilities.

With the conventional oil seal device as shown in FIG. 1, a floating metal c rotatably supports a combined turbine and blower shaft b in a bearing casing a and is lubricated by lubricant, which is supplied through oil passages d formed in the bearing casing a and through openings e cut radially through the floating metal c. Oil that has leaked toward a turbine wheel f through gaps between the bearing casing and the floating metal and between the floating metal and the common shaft b is thrown outwardly by an oil thrower g. An oil seal ring h prevents oil that has flowed over the oil thrower g from further leaking toward the turbine wheel f. The conventional seal device with the above construction, however, has a disadvantage that, depending on the amount of lubricating oil supplied and the revolution speed of the common shaft, the amount of oil that runs over the oil thrower may increase and that it is difficult to completely seal the oil.

The primary object of the present invention is to provide an oil seal device which eliminates the above drawback and which has high sealing capability and is simple in construction.

The present invention will become more apparent from the following description of preferred embodiments thereof taken in conjunction with the accompanying drawings.

DESCRIPTION OF THE PREFERRED EMBODIMENTS

Figure 1:
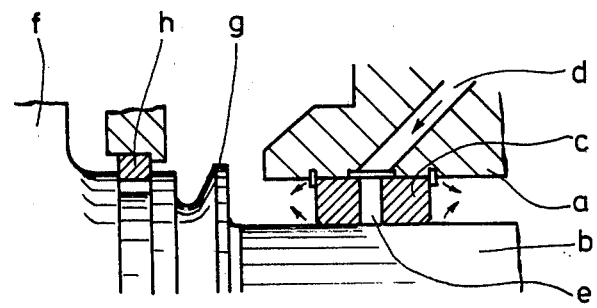
FIG. 1 shows a portion of the conventional oil seal device.
Figure 2:
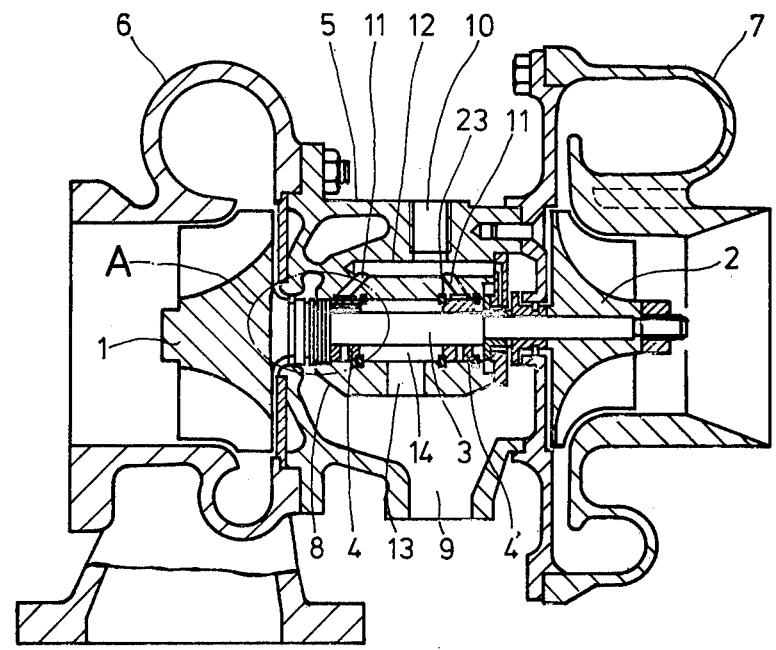
FIG. 2 is a sectional view of a turbocharger equipped with a first embodiment of an oil seal device according to the present invention.
Figure 3:
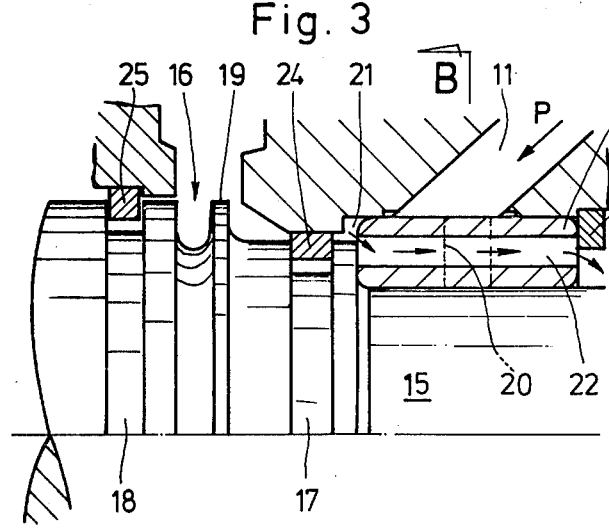
FIG. 3 is an enlarged view of portion A of FIG. 2.
Figure 4:
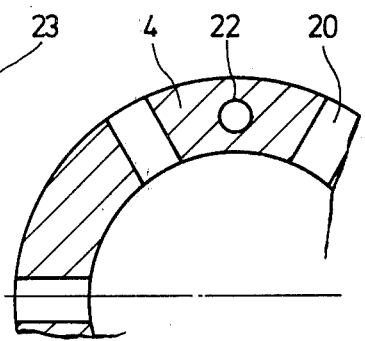
FIG. 4 is a partial sectional view of a floating metal, taken along and viewed from the arrow B of FIG. 3.

Referring to FIGS. 2 through 4, interposed between the turbine casing 6 and the blower casing 7 is a bearing casing 5 in which a common turbine and blower shaft 3 is rotatably supported by floating metals 4 and 4', with a turbine wheel 1 and a blower wheel 2 attached to ends of the rotating shaft 3. The bearing casing 5 consists of a bearing portion 8 and an oil discharge chamber 9 formed beneath the bearing portion 8. The bearing portion 8 is constructed such that a radial oil inlet 10 connected to an external oil supply source (not shown) communicates through an axial oil passage 12 with branch passages 11 leading to the floating metals 4 and 4' and that a gap 14 formed between the common shaft 3 and the bearing portion 8 communicates with an oil discharge chamber 9 through a radial oil outlet 13 provided at the lower part of the bearing portion 8.

The seal portion 16 of the common turbine and blower shaft 3 adjacent to the supported portion 15 is expanded in diameter toward the turbine wheel 1 in two steps. The steps are formed with grooves 17 and 18 for sealing oil respectively. A flange-shaped oil thrower 19 is formed at the border between the two steps. The floating metal 4, which is interposed between the common shaft 3 and the bearing portion 8 to rotatably support the common shaft 3, has two kinds of openings formed through it. One is oil feed openings 20 radially extending through the floating metal 4 and connected with the branch passage 11. The other is oil release openings 22 axially extending through the floating metal 4 which bring into communication a gap 21 defined by the seal portion 16, the bearing portion 8 and the floating metal 4 and the gap 14 defined by the bearing portion 8 and the common shaft 3. The floating metal 4 is held in place by a snap ring 23 and the seal portion 16, and oil seal rings 24 and 25 are installed into the grooves 17 and 18, respectively.

The lubricating oil P is supplied through the radial oil inlet 10 into the axial oil passage 12 and the branch passages 11, flows through the oil feed openings 20 and advances between the floating metal 4 and the common shaft 3 and then flows out into the gap 14, from which the used oil is allowed to flow down the radial oil outlet 13 and into the oil discharge chamber 9, thus lubricating the bearing portion 8. The lubricating oil which has entered the gap 21 is prevented from further flowing toward the turbine wheel 1 by the oil seal ring 24 but is allowed to flow through the oil release openings 22 into the gap 14. Since the oil in the gap 21 is positively evacuated through the oil release openings 22, the pressure in the gap 21 is kept from becoming high, thus enabling the oil seal ring 24 to effectively seal the oil. Thus only a small amount of oil, if any, will leak through the oil seal ring 24 and reach the oil thrower 19, which can easily throw it away. Then almost no oil can flow over the oil thrower 19 toward the oil seal ring 25, and if the oil should run over the oil thrower 19, the oil seal ring 25 will prevent it from further leaking into the turbine.

Figure 5:
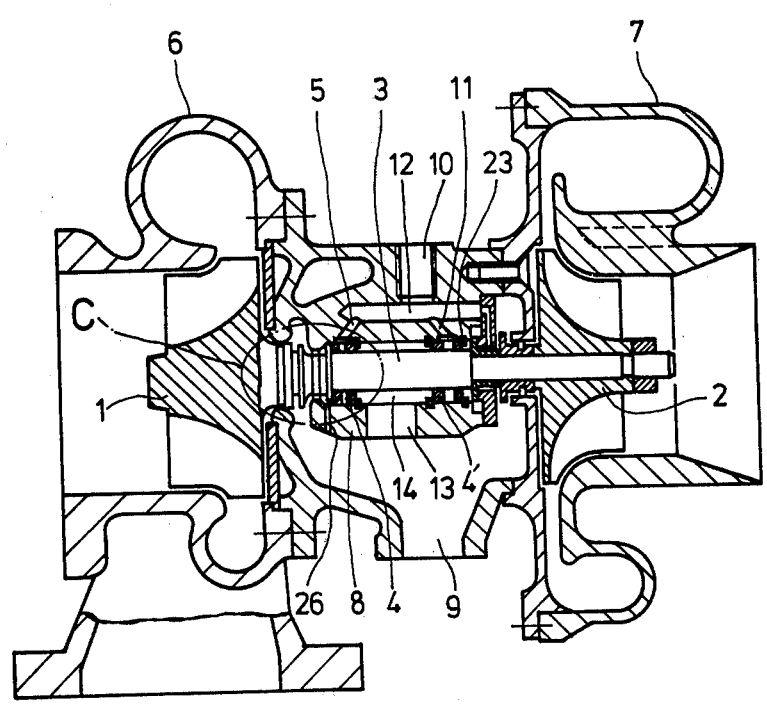
FIG. 5 is a sectional view of a turbocharger equipped with a second embodiment of an oil seal device according to the present invention.
Figure 6:
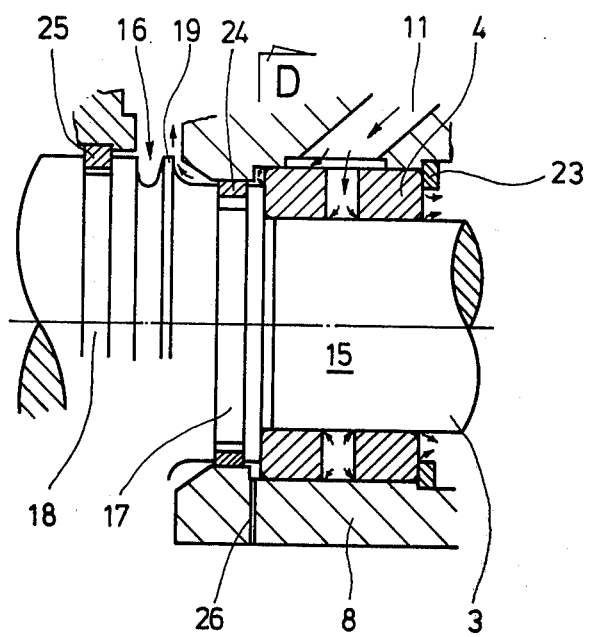
FIG. 6 is an enlarged view of portion C of FIG. 5.
Figure 7:
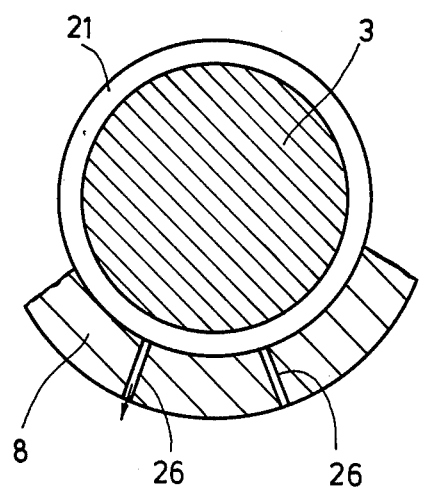
FIG. 7 is a sectional view taken along and viewed from the arrow D of FIG. 6.

FIGS. 5 through 7 show a second embodiment of the present invention in which the oil in the gap 21 is directly released into the oil discharge chamber 9 through oil release openings 26 which are formed in the bearing portion 8 rather than in the floating metal 4.

Components in the second embodiment that are identical with those in the first embodiment are denoted by the same reference numerals.

So far the present invention has been described in conjunction with the turbochargers, but it should be noted that the oil seal device of the present invention is applicable to any high speed rotating machine, that the device may be also used on the blower side as well as the turbine side, and that the number and the location of the oil release openings can be selected as required. It should be also noted that various modifications can be effected without departing from the true spirit and scope of the present invention.

The oil seal device according to the present invention for use with the high speed rotating machines has the following features:

(i) Since the oil seal ring is provided between the floating metal and the oil thrower so that after lubricating the floating metal the oil is blocked by the seal ring from leaking to the turbine side and since the blocked oil is vented out through the oil release openings, a high sealing performance can be obtained.

(ii) The device is simple in construction and has high performance so that it can be constructed in a small space. Thus it is most suitable for small turbochargers.

(iii) The oil seal ring near the floating metal blocks most of the oil so that the oil thrower can fully perform its function. This in turn ensures a stable sealing performance irrespective of the revolution speed and the amount of lubricating oil supplied.

What is claimed is:

1. In a high speed rotating machine, in combination:
   (a) a common rotating turbine and blower shaft;
   (b) a bearing casing having a bearing portion and an oil discharge chamber formed below said bearing portion;
   (c) an oil thrower laterally spaced from said casing and mounted on said shaft;
   (d) a floating metal structure supported in said casing bearing portion and supporting said shaft;
   (e) first and second oil seal rings, the first of said oil seal rings being mounted in said casing between and laterally spaced from said oil thrower and one end of said floating metal structure and the second of said oil seal rings being mounted in machine structure on an opposite side of said thrower; and
   (f) structural means forming oil release and gap openings enabling oil accumulating between said first oil seal ring and said floating metal structure to be communicated to said oil discharge chamber.

2. In a high speed rotating machine as claimed in claim 1 wherein said structural means forms a gap between said first oil seal ring and said floating metal structure and said gap forms part of an oil release path communicating with said oil discharge chamber.

3. In a high speed rotating machine as claimed in claim 2 and wherein said structural means includes oil release openings formed in said bearing portion of said casing and communicating with said chamber and said gap.

4. In a high speed rotating machine as claimed in claim 1 wherein said structural means includes oil release openings formed in said bearing portion of said casing and communicating with said chamber.

5. In a high speed rotating machine as claimed in claim 1 wherein said structural means includes said floating metal structure and said floating metal structure includes said oil release openings.

6. In a high speed rotating machine as claimed in claim 5 wherein said oil release openings comprise oil release openings formed through and running lengthwise of said floating metal structure.

* * * * *